United States Patent [19]

Stoll et al.

[11] Patent Number: 5,642,210
[45] Date of Patent: Jun. 24, 1997

[54] METHOD FOR MITIGATING CROSS-TALK IN HIGH-EFFICIENCY HOLOGRAMS

[75] Inventors: Harold M. Stoll, Rancho Palos Verdes; James J. Reis, San Pedro, both of Calif.

[73] Assignee: Northrop Grumman Corporation, Los Angeles, Calif.

[21] Appl. No.: 420,939

[22] Filed: Apr. 12, 1995

[51] Int. Cl.$^6$ .............. G03H 1/10; G03H 1/12; G03H 1/02; G03H 1/04
[52] U.S. Cl. .............. 359/10; 359/11; 359/7; 359/35
[58] Field of Search .............. 359/10, 7, 29, 359/286, 11, 35

[56] References Cited

U.S. PATENT DOCUMENTS

| | | | |
|---|---|---|---|
| 4,359,259 | 11/1982 | Homer et al. | 359/15 |
| 4,645,300 | 2/1987 | Brandstetter et al. | 359/285 |
| 5,339,177 | 8/1994 | Jenkins et al. | 359/35 |
| 5,440,669 | 8/1995 | Rakuljic et al. | 359/7 |

OTHER PUBLICATIONS

"Multiple Storage and Erasure of Fixed Holograms in Fe–Doped LiNbO$_3$", *Applied Physics Letters*, vol. 26, No. 4, p. 182 (1975).

"Storage of 500 High–Resolution Holograms in a LiNbO$_3$ Crystal", *Optics Letters*, vol. 16, No. 8, p. 605 (1991).

"Theory of Optical Information Storage in Solids", *Applied Optics*, vol. 2, No. 4, p. 393 (1963).

"Self Enhancement in Lithium Niobate", *Optics Communications*, vol. 72, No. 3, 4, p. 175 (1989).

"Single–Step Copying Process for Multiplexed Volume Holograms", *Optics Letters*, vol. 17, No. 9, p. 676 (1992).

*Primary Examiner*—Paul M. Dzierzynski
*Assistant Examiner*—Audrey Y. Chang
*Attorney, Agent, or Firm*—Terry J. Anderson; Karl J. Hoch, Jr.

[57] ABSTRACT

In a method for mitigating cross-talk in high-efficiency, angle-multiplexed holograms stored in photorefractive media, a plurality of uniformly low-efficiency holograms are first stored within a common holographic storage medium and then simultaneously exposed to a like plurality of mutually incoherent reference beams. Each reference beam effects enhancement of its corresponding hologram so as to increase the level thereof while also minimizing cross-talk between holograms.

10 Claims, 2 Drawing Sheets

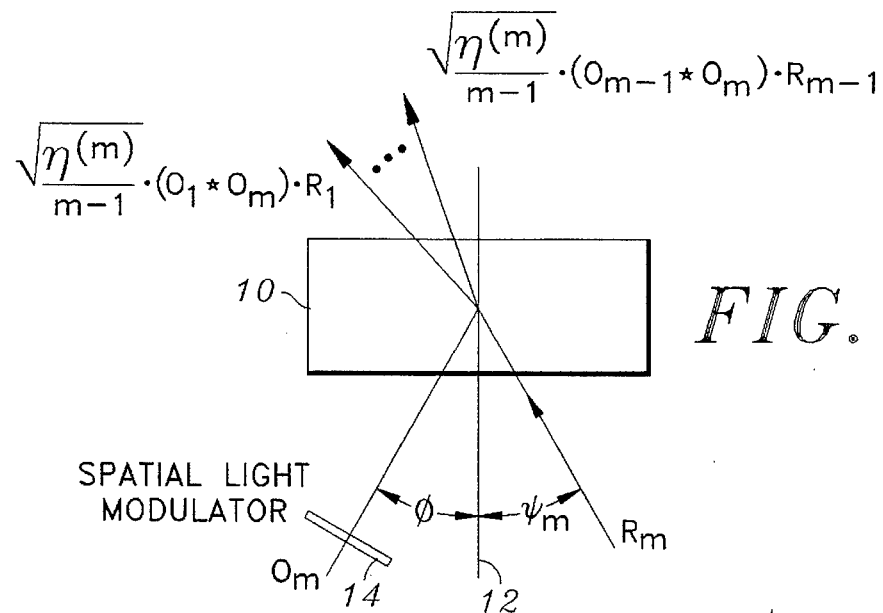
FIG. 3
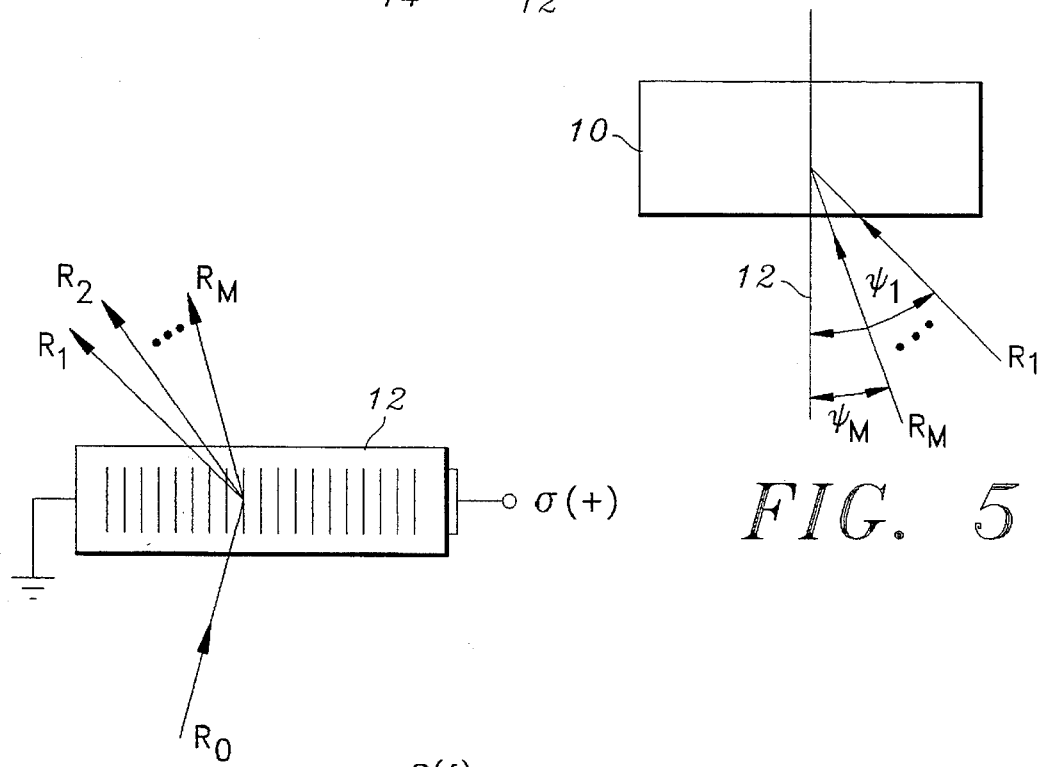
FIG. 5
FIG. 6
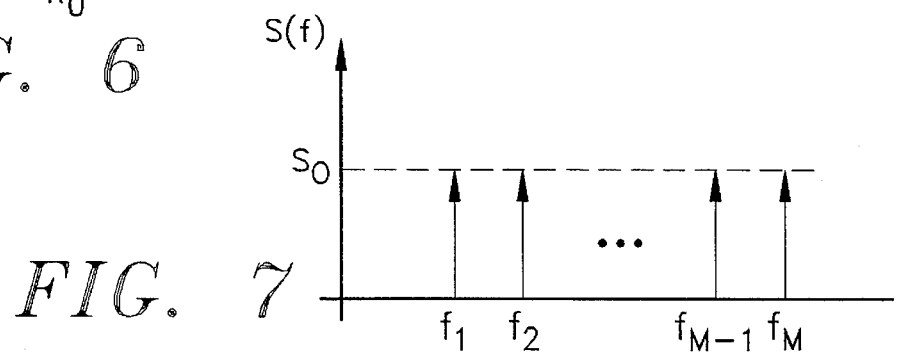
FIG. 7

METHOD FOR MITIGATING CROSS-TALK IN HIGH-EFFICIENCY HOLOGRAMS

FIELD OF THE INVENTION

The present invention relates generally to holographic storage devices and more particularly to a method for mitigating cross-talk in high-efficiency holograms in which low-efficiency holograms are first formed according to a prescribed exposure schedule and then simultaneously exposed to mutually incoherent reference beams so as to increase the efficiencies of the holograms via self-enhancement. The reference beams have a frequency separation which is at least as great as one-half the inverse of the exposure time for the holograms.

BACKGROUND OF THE INVENTION

Holographic techniques for storing images are well known. Such techniques are commonly used to store images of three-dimensional objects in a variety of different applications. Additionally, various methodologies for utilizing such holographic techniques to store digital data for use in computer systems are currently being explored.

The technique for forming a hologram comprises splitting the highly coherent output beam of a laser into separate reference and object beams. The reference laser beam is directed onto the holographic storage medium, e.g., a photorefractive material, while the object beam is simultaneously directed onto the object whose image is to be stored. Light reflected from the object is directed onto the holographic storage medium, wherein an interference pattern is formed via interference of the reference laser beam with the reflected light of the object beam.

In the case of digital data storage, the object beam passes through an optical modulator, e.g., a liquid crystal spatial light modulator, rather than being reflected off the object to be imaged.

A reconstruction of the originally illuminated object or digital data may be obtained by subsequently directing a reference laser beam onto the holographic storage medium.

A technique generally referred to as angle-multiplexing may be used to store a plurality of such images within a common volume of a holographic storage medium such as lithium niobate. Such angle-multiplexing is discussed in "THEORY OF OPTICAL INFORMATION STORAGE IN SOLIDS," Applied Optics, Vol. 2, No. 4, p. 393 (1963). The method of angle multiplexing generally involves maintaining a constant angle for the object beam, while varying the angle of the reference laser beam for each exposure. Angle-multiplexing thus allows a large number of holograms to be stored within a common volume of holographic storage medium, thereby greatly enhancing the storage density thereof. In the case of digital data storage, such holograms provide high-density storage means suitable for use in computer systems.

The storage of high-efficiency, angle-multiplexed holograms, may, however, result in undesired cross-talk between the stored holograms, as discussed in detail below. As such, it is desirable to provide means by which cross-talk between such holograms may be substantially reduced or completely eliminated.

SUMMARY OF THE INVENTION

The present invention specifically addresses and alleviates the above-mentioned cross-talk noise problem associated with the prior art. More particularly, the present invention comprises a method for mitigating cross-talk in high-efficiency, angle-multiplexed holograms, wherein a subset of the holograms are first formed at a lower uniform diffraction efficiency and then self-enhanced via exposure to a plurality of mutually incoherent reference beams (i.e., reference beams having different optical frequencies). The mutual incoherence of the reference beams permits each reference beam to self-enhance its corresponding hologram without introducing extraneous plane-wave holograms into the original hologram sequence. The self-enhancement effect, which may be unique to photorefractive holographic storage media such as lithium niobate, is described in "SELF-ENHANCEMENT IN LITHIUM NIOBATE," Optics Communications, Vol. 72, Nos. 3 and 4, Jul. 15, 1989.

When a sequence of high-efficiency holograms is stored using the angle-multiplexing technique, cross-talk noise may be introduced if the spatially distributed information contained within each hologram is not orthogonal to the information contained within every other hologram. In this case, subsequent excitation of a specific hologram leads to partial excitation, or recall of all holograms not orthogonal to the desired hologram.

The above cross-talk noise problem may be mitigated by first forming a subset of low-efficiency holograms in which the (unavoidable) cross-talk noise is kept to an acceptable level and, then, uniformly self-enhancing the efficiency of these holograms prior to appending the remaining holograms of the originally intended sequence.

Self-enhancement is achieved by exposing the first, low-efficiency holograms to a plurality of mutually incoherent reference beams, each one of which is incident on the storage medium at the original angle used to form the holograms. By using mutually incoherent reference beams whose optical frequencies differ from one-another by a prescribed amount, undesired angle-multiplexed plane-wave holograms, which would otherwise be formed by interference between pairs of reference beams, are prevented from forming. These mutually incoherent reference beams are preferably generated by an acousto-optic modulator. In the preferred embodiment of the present invention, the number of simultaneously generated, mutually incoherent reference beams is equal to the number of holograms to be self-enhanced.

These, as well as other advantages of the present invention will be more apparent from the following descriptions and drawings. It is understood that changes in the specific structure shown and described may be made within the scope of the claims without departing from the spirit of the invention.

BRIEF DESCRIPTION OF THE DRAWINGS

FIG. 3 schematically illustrates the formation of cross-talk holograms generated by the interference of reference beam $R_m$ with re-constructed reference beams $R_1$ through $R_{m-1}$, and are generated at the same time that the intended hologram is formed by interfering object beam $O_m$ and reference beam $R_m$;

FIG. 5 schematically illustrates the simultaneous exposure of the holographic storage medium to a plurality of mutually incoherent reference beams $R_1, \ldots, R_M$, which results in self-enhancement of all M previously recorded low-efficiency holograms, without the generation of undesired cross-talk holograms among the reference beams;

FIG. 6 schematically illustrates an RF driven acoustooptic Bragg cell for simultaneously generating equal-amplitude reference beams, each one of which is frequency shifted relative to the other; and FIG. 7 schematically illustrates the frequency spectrum of the input signal used to drive the acoustooptic Bragg cell of FIG. 6.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The method for mitigating cross-talk in high-efficiency holograms of the present invention is illustrated in FIGS. 1-7 which depict the presently preferred embodiment of the invention.

Figure 1:
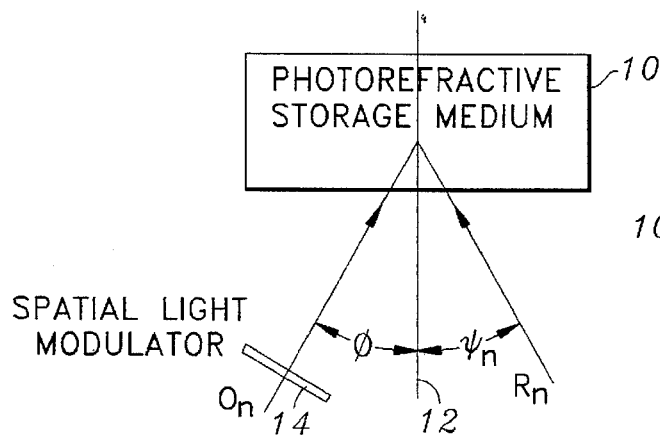
FIG. 1 schematically illustrates the storage of a hologram within a photo-refractive storage medium according to contemporary methodology.

Referring now to FIG. 1, the storage of the $n^{th}$ hologram within of a sequence of N angle-multiplexed holograms is shown. Object beam $O_n$, incident on the holographic storage medium 10 at angle $\phi$ to the storage medium's normal 12, interferes with reference beam $R_n$, incident on the storage medium 10 at angle $\psi_n$ to the normal 12, thereby forming the $n^{th}$ hologram within the storage medium 10. Data, typically digital information, is preferably stored within the $n^{th}$ hologram by using a two-dimensional spatial light modulator 14 to modulate the object beam $O_n$, thereby adding the data thereto. This process is sequentially repeated by episodically changing the information content input to the spatial light modulator 14; incrementing angle $\psi_n$ to $\psi_{n+1}$; and then re-exposing the storage medium to object beam $O_{n+1}$ and reference beam $R_{n+1}$. In this manner N holograms (n=1, 2, . . . , N) are angle-multiplexed within the storage medium 10. All holograms may be formed so as to have the same diffraction efficiency by using an exposure schedule (see F. H. Mok, M. C. Tackitt, and H. M. Stoll, "STORAGE OF 500 HIGH-RESOLUTION HOLOGRAMS IN A LiNbO$_3$ CRYSTAL," Optics Letters, Vol. 16, No. 8, p. 605, 1991) in which the first holograms are formed using relatively large exposure energies and the last holograms are formed using relatively small exposure energies.

Figure 2:
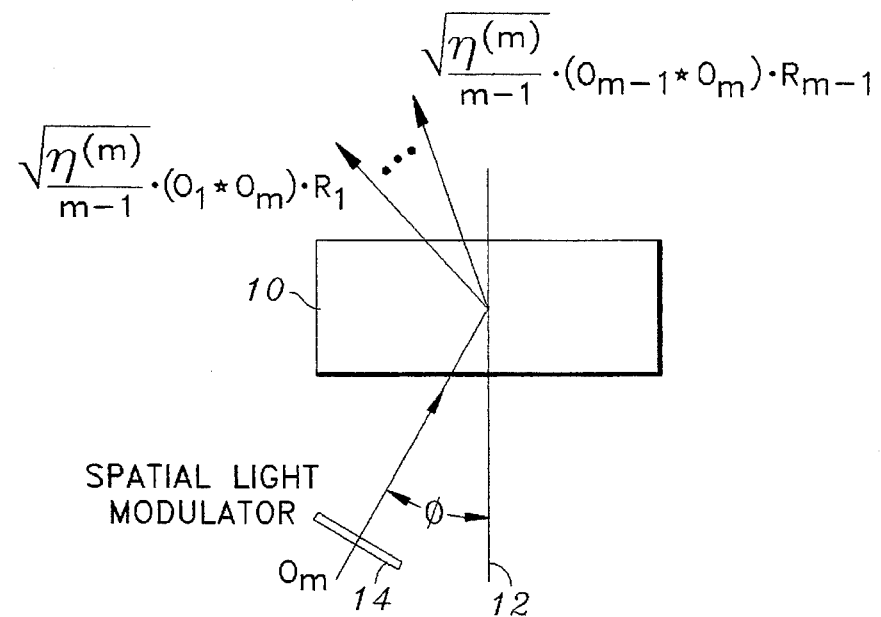
FIG. 2 schematically illustrates the excitation of reference beams $R_1$ through $R_{m-1}$ when the holographic storage medium is illuminated by object beam $O_m$, when $O_m$ is not spatially orthogonal to previously stored object beams $O_1$ through $O_{m-i}$.

Referring now to FIG. 2, cross-talk between angle-multiplexed holograms occurs when strongly diffracting holograms are stored. Unless object beams $O_1, O_2, \ldots, O_{m-1}$ are all spatially orthogonal to $O_m$, then during storage of $O_m$, reference beams $R_1$ through $R_{m-1}$ will be excited upon illumination of the storage medium with $O_m$. The amplitudes of each of the excited reference beams will be approximately proportional to:

$$\frac{\sqrt{\eta^{(m)}}}{m-1} \cdot (O_i^*O_m); i=1, 2, \ldots, m-1 \quad (1)$$

where $\eta_{(m)}$ is the diffraction efficiency of each of the m stored holograms, $O_i$ is the $i^{th}$ object beam, "*" denotes correlation or inner product, and it has been assumed that the $(O_i^*O_m)$ are approximately equal for all "i".

Referring now to FIG. 3, upon simultaneous exposure of the storage medium to object beam $O_m$ and reference beam $R_m$, cross-product holograms resulting from interference between $R_m$ and re-excited reference beams R, through $R_{m-1}$ will, therefore, be stored along with the desired hologram formed by interfering $R_m$ with $O_m$.

Figure 4:
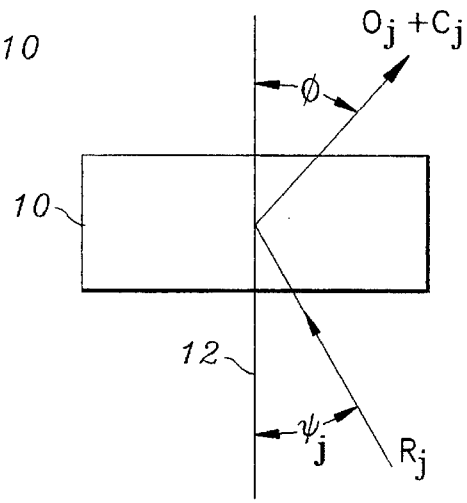
FIG. 4 schematically illustrates the reconstruction of object beam $O_j$ by reference beam $R_j$ and the simultaneous partial reconstruction of all M holograms (cross-talk noise $c_j$)

With particular reference to FIG. 4, reconstruction of one of the intentionally stored holograms will consequently also reconstruct, to some extent, all of the other holograms. It can be shown that, following storage of N holograms, the cross-talk noise, $C_j$, generated upon excitation of object beam $O_j$ by reference beam $R_j$ is given approximately by:

$$C_j = [\eta^{(N)}]^2 \cdot \qquad (2)$$

$$\left\{ \sum_{k=1}^{j-1} \left[ \frac{(O_j^*O_k)}{j-1} \right]^2 \cdot O_k + \sum_{k=j+1}^{N} \left[ \frac{(O_j^*O_k)}{k-1} \right]^2 \cdot O_k \right\}$$

where $\eta^{(N)}$ is the diffraction efficiency of each of the N stored holograms:

If $[\eta^{(N)}/(j-1)]^2$ in Equation (2) remains sufficiently small (for j=2, 3, . . . , N), then the problem of cross-talk may be ignored, as long as the cross-talk signal-to-noise ratio is acceptable. However, it is almost always desirable to maximize $\eta^{(N)}$.

The present invention provides a method for maximizing $\eta^{(N)}$ while, at the same time, minimizing undesirable cross-talk. The procedure is as follows:

(a) The first M holograms of an eventual sequence of N holograms are formed using an exposure schedule which yields a diffraction efficiency of $\eta^{(N)}(<<\eta^{(N)})$ for each hologram such that $[\eta^{(M)}/(j-1)]^2$ remains acceptably small (for j=2, 3, . . . , M).

(b) Referring to FIG. 5, the diffraction efficiencies, $\eta^{(M)}$, of the first M holograms are simultaneously increased to $\eta^{(MAX)}$ (the largest efficiency possible for M, angle-multiplexed holograms), by exposing the storage medium to M mutually incoherent reference beams, $R_i$ (i=1, 2, . . . , M), each of which is incident on the storage medium at the same angle, $\psi_i$, used originally to store the $i^{th}$ hologram. The increase in efficiency enjoyed by each of the M holograms is due to the well-documented self-enhancement effect in photorefractive storage media ("SELF-ENHANCEMENT IN LITHIUM NIOBATE," Optics Communications, Vol. 72, Nos. 3 and 4, Jul. 15, 1989). Undesired, plane-wave holograms, generated by interference between pairs of reference beams $R_i$ and $R_j$, are prevented from forming during this process by using reference beams whose optical frequencies differ by at least, $$\Delta v = v_i - v_j \geq \frac{1}{2}\Delta t \qquad (3)$$

where $\Delta t$ is the self-enhancement exposure time. The constraint of Equation (3) ensures that pairs of reference beams form only traveling-wave interference patterns which move by at least one-half a period during $\Delta t$ and, therefore, destructively interfere with themselves before undesired hologram formation can occur.

(c) The remaining N-M holograms are formed using an exposure schedule which yields a uniform diffraction efficiency of $\eta^{(N)}(<\eta^{(MAX)})$ for all N holograms, where $\eta^{(N)}$ is the maximum diffraction efficiency possible for N angle-multiplexed holograms.

Referring now to FIG. 6, a set of reference beams ($R_1$, $R_2$, ..., $R_M$) with the requisite frequency separation given by Equation (3) is preferably generated using an acoustooptic Bragg cell.

Referring now to FIGS. 6 and 7, the RF signal, $\sigma(t)$, that drives the Bragg cell must have the frequency spectrum S(f). The $\sigma(t)$ which corresponds to S(f) is a periodic linear chirp, in which the chirp spans the entire spectrum of S(f) and the period is the inverse of $v_i-v_j$ (j=i+1, typically).

As an example, consider a typical Bragg cell with a bandwidth of 100 MHz. The simultaneous self-enhancement of 1,000 holograms therefore implies a frequency separation ($v_i-v_j$) of $10^5$ HZ and an exposure time which must be at least $5 \times 10^{-6}$ seconds long.

It is understood that the exemplary method for mitigating cross-talk in high-efficiency holograms described herein and shown in the drawings represents only a presently preferred embodiment of the present invention. Indeed, various modifications and additions may be made to such embodiment without departing from the spirit and scope of the invention. For example, limitations in the number of holograms that can be simultaneously self-enhanced may require that two or more smaller groups of holograms be sequentially generated and self-enhanced prior to completing the generation of all N holograms of a sequence. These and other modifications and additions may be obvious to those skilled in the art and may be implemented for use in variety of different applications.

What is claimed is:

1. A method of mitigating cross-talk within a sequence of high-diffraction-efficiency holograms stored in photorefractive medium, said method comprising the steps of:
   a) forming a sequence of angularly multiplexed holograms having uniform diffraction efficiency according to an exposure schedule;
   b) simultaneously exposing the photorefractive medium to a plurality of incoherent reference beams, each reference beam being oriented at an angle corresponding to the angle at which an hologram of said sequence of holograms was originally stored within the photorefractive medium, where the incoherent reference beams are produced by adjusting the frequency of each of the reference beams and its exposure time to the medium such that the difference in frequency between each reference beam is at least equal to one-half of the inverse of the exposure time, to increase the diffraction efficiency of said sequence of holograms stored within the medium without introducing additional interference patterns resulted from said reference beams.

2. The method as recited in claim 1 wherein the frequency of each of the reference beams differs from the frequency of any other reference beam by an amount sufficient to avoid generation of plane-wave holograms due to reference beam inference.

3. The method as recited in claim 1 wherein the plurality of reference beams are generated by an acousto-optic modulator.

4. The method as recited in claim 1 wherein the plurality of reference beams are generated by a Bragg cell.

5. The method as recited in claim 1 wherein the plurality of reference beams are generated by a Bragg cell driven by a radio frequency periodic linear chirp signal.

6. The method as recited in claim 1 wherein the number of reference beams is equal to the number of stored holograms.

7. The method as recited in claim 1 wherein the photorefractive medium comprises iron doped lithium niobate.

8. The method as recited in claim 1 wherein the exposure time is regulated such that later formed groups of holograms are formed at a lower efficiency than earlier formed groups of holograms.

9. The method as recited in claim 1 wherein the plurality of holograms are serially generated.

10. The method as recited in claim 9 wherein the plurality of reference beams are serially generated.

* * * * *